US012699269B2

(12) United States Patent
Xie et al.

(10) Patent No.: US 12,699,269 B2
(45) Date of Patent: Aug. 4, 2026

(54) OPTICAL MODULE AND HEAD MOUNT DISPLAY

(71) Applicant: Goertek Optical Technology Co., Ltd., Weifang (CN)

(72) Inventors: Mingxian Xie, Weifang (CN); Jiaqian Xu, Weifang (CN)

(73) Assignee: Goertek Optical Technology Co., Ltd., Weifang (CN)

( * ) Notice: Subject to any disclaimer, the term of this patent is extended or adjusted under 35 U.S.C. 154(b) by 289 days.

(21) Appl. No.: 18/566,789

(22) PCT Filed: Nov. 26, 2021

(86) PCT No.: PCT/CN2021/133325
§ 371 (c)(1),
(2) Date: Dec. 4, 2023

(87) PCT Pub. No.: WO2022/252516
PCT Pub. Date: Dec. 8, 2022

(65) Prior Publication Data
US 2024/0264445 A1 Aug. 8, 2024

(30) Foreign Application Priority Data

Jun. 3, 2021 (CN) .......................... 202110621786.9

(51) Int. Cl.
*G02B 27/01* (2006.01)
(52) U.S. Cl.
CPC ................................ *G02B 27/0172* (2013.01)

(58) Field of Classification Search
CPC .............. G02B 27/0172; G02B 27/283; G02B 2027/015
See application file for complete search history.

(56) References Cited

U.S. PATENT DOCUMENTS

| | | | | |
|---|---|---|---|---|
| 2016/0377868 A1* | 12/2016 | Ouderkirk | ............ | G02B 6/0046 |
| | | | | 359/485.01 |
| 2020/0341268 A1* | 10/2020 | Amirsolaimani | .... | G02B 5/3083 |
| 2021/0199969 A1* | 7/2021 | Chen | .................... | G02B 27/286 |
| 2021/0333557 A1* | 10/2021 | Qin | .......................... | G02B 5/04 |

FOREIGN PATENT DOCUMENTS

| | | |
|---|---|---|
| CN | 110941088 A | 3/2020 |
| CN | 111077672 A | 4/2020 |
| CN | 113419349 A | 9/2021 |

* cited by examiner

*Primary Examiner* — Mariam Qureshi
(74) *Attorney, Agent, or Firm* — Baker Botts, LLP

(57) ABSTRACT

Disclosed are an optical module and a head mount display. The optical module includes: a displaying assembly, a first lens, a second lens, a first quarter-wave plate and a polarizing reflective film. The displaying assembly is configured to emit light in a circularly polarized state. The first lens is provided in a light-emergent direction of the displaying assembly. The second lens is provided in a light-emergent direction of the first lens. Light is emitted into the second lens before being reflected to the third reflecting surface by the second reflecting surface. The first quarter-wave plate is provided on the third reflecting surface. The polarizing reflective film is provided on one side of the first quarter-wave plate that faces away from the second reflecting surface.

18 Claims, 2 Drawing Sheets

OPTICAL MODULE AND HEAD MOUNT DISPLAY

CROSS-REFERENCE TO RELATED APPLICATIONS

This application is a National Stage of International Application No. PCT/CN2021/133325, filed on Nov. 26, 2021, which claims priority to Chinese Patent Application No. 202110621786.9, filed on Jun. 3, 2021, both of which are hereby incorporated by reference in their entireties.

TECHNICAL FIELD

The present disclosure relates to the field of optical display technology, and in particular, to an optical module and a head mount display.

BACKGROUND

With the development and upgrade of advanced optical design as well as processing technologies, display technologies and processors thereof, forms and types of Head Mount Display (HMD) products are emerging in an endless stream, and application fields of HMD products are becoming progressively wider. An HMD displays images that are to be transmitted to the human eye through optical lenses. A sufficiently long optical path is required to magnify and transmit the image, resulting in a thick optical system and therefore a bulky HMD.

SUMMARY

Based on this, in view of bulky HMDs in the prior art due to thick optical systems therein, it is necessary to provide an optical module and an HMD aiming to reduce optical system thicknesses and HMD sizes.

In order to achieve the above object, the present disclosure proposes an optical module which includes:

a displaying assembly, configured to emit light in a circularly polarized state;

a first lens, provided in a light-emergent direction of the displaying assembly, the first lens having a first reflecting surface, light being emitted into the first lens before being reflected by the first reflecting surface and exiting the first lens;

a second lens, provided in a light-emergent direction of the first lens, the second lens having a second reflecting surface and a third reflecting surface, light being emitted into the second lens before being reflected to the third reflecting surface via the second reflecting surface;

a first quarter-wave plate, provided on the third reflecting surface, and a polarizing reflective film, provided on one side of the first quarter-wave plate that faces away from the second reflecting surface.

Optionally, the optical module comprises a spectroscopic element, provided on the second reflecting surface.

Optionally, the spectroscopic element is a transflective film provided on the second reflecting surface.

Optionally, the first lens and the second lens are glue bonded; or the first lens and the second lens are integrally provided; or the first lens and the second lens are separately provided and spaced apart from each other.

Optionally, light is emitted toward the first reflecting surface, and an incident angle of the light on the first reflecting surface is greater than or equal to a critical angle of total reflection; or the optical module further comprises a reflective film provided on the first reflecting surface.

Optionally, the first lens further comprises: a first light-incident surface provided facing the displaying assembly, and a first light-emergent surface provided facing the second lens, wherein both the first light-incident surface and the first light-emergent surface are connected to the first reflecting surface; and at least one of the first light-incident surface and the first light-emergent surface is a spherical surface, an aspherical surface or a free-form surface.

Optionally, the second reflecting surface and the third reflecting surface intersect at one end thereof away from the first lens, the second lens including a second light-incident surface which faces the first lens, the second light-incident surface being connected to the second reflecting surface and the third reflecting surface; and at least one of the second light-incident surface and the second reflecting surface is a spherical surface, an aspherical surface or a free-form surface.

Optionally, the optical module further comprises a third lens provided on the second reflecting surface, the third lens comprising a third light-incident surface, the third light-incident surface and the third reflecting surface are provided opposite to each other and parallel to each other.

Optionally, a defined distance D from the third light-incident surface to the third reflecting surface satisfies: D<12 mm.

Optionally, light emitted from the displaying assembly causes imaging at a human-eye position; and a defined distance L from the third reflecting surface to the human-eye position satisfies: 12 mm<L<18 mm.

Optionally, the first reflecting surface and the third reflecting surface are located in the same plane.

Optionally, the displaying assembly comprises a display, a linear polarizer and a second quarter-wave plate, the display being configured to emit light, and the linear polarizer and the second quarter-wave plate being sequentially provided in a propagation direction of the light.

Optionally, the optical module further comprises an achromatic lens provided between the first lens and the displaying assembly.

Optionally, the second reflecting surface comprises a first reflecting area and a second reflecting area, wherein the first reflecting area receives light passing through the first lens and reflects it to the third reflecting surface, the second reflecting area receives light reflected by the polarizing reflective film and also reflects it to the third reflecting surface, the third lens and the second lens are provided spaced apart from each other at least in the first reflecting area.

In addition, in order to solve the above problems, the present disclosure also provides an HMD, which comprises a housing and an optical module as described above, wherein the optical module is provided in the housing.

In the technical solution proposed in the present disclosure, the displaying assembly emits light in a circularly polarized state. After the light is emitted into the first lens, it is reflected at the first reflecting surface of the first lens, and then enters the second lens. The light is also reflected at the second reflecting surface of the second lens, and then is emitted to the third reflecting surface. The third reflecting surface is provided with a first quarter-wave plate and a polarizing reflective film. Circularly polarized light passes through the first quarter-wave plate, and is converted into linearly polarized light. The polarizing reflective film has a polarized transmission direction, which is different from the polarization direction of the linearly polarized light at this moment. The linearly polarized light is reflected back to the first quarter-wave plate by the polarizing reflective film and converted into circularly polarized light. The light is again emitted to the second reflecting surface of the second lens. Under the action of the second reflecting surface, the circularly polarized light is reflected to the first quarter-wave plate again, and the polarization handedness of the circularly polarized light changes. After the circularly polarized light passes through the first quarter-wave plate, it is again converted into linearly polarized light. At this moment, the polarization direction of the linearly polarized light is in the same direction as the polarized transmission direction of the polarizing reflective film, and the light passes through the polarizing reflective film and performs imaging at the human-eye position. It can be seen from the above that the light emitted by the displaying assembly passes through the first lens and the second lens in sequence: the light first passes by the first reflecting surface, then passes by the second reflecting surface, and is emitted to the third reflecting surface. After being emitted to the third reflecting surface, the light is reflected back to the second reflecting surface under the action of the first quarter-wave plate and the polarizing reflective film, and is again reflected by the second reflecting surface. At this moment, the polarization state of the light is circularly polarized. After the light passes through the first quarter-wave plate again, it becomes linearly polarized light and its vibration direction is in the same direction as the transmission direction of the polarizing reflective film, so that the light may pass through the polarizing reflecting surface. The light has undergone at least four reflections and has been transmitted back and forth in the second lens. It can be seen that the arrangement of the second lens avoids lengthening propagation path of the light and reduces the need for additional lenses. This enables processing and producing of a thinner optical system, and is beneficial to miniaturization of the HMD.

BRIEF DESCRIPTION OF THE DRAWINGS

In order to clearly illustrate embodiments of the present disclosure or the technical solutions in the prior art, the accompanying drawings that need to be used in the description of the embodiments or the prior art will be briefly introduced below. Obviously, in the following description, the drawings are no more than a few embodiments of the present disclosure. For those of ordinary skill in the art, other drawings can be obtained based on the structures shown in these drawings without exerting creative efforts.

REFERENCE SIGNS

Figure 1:
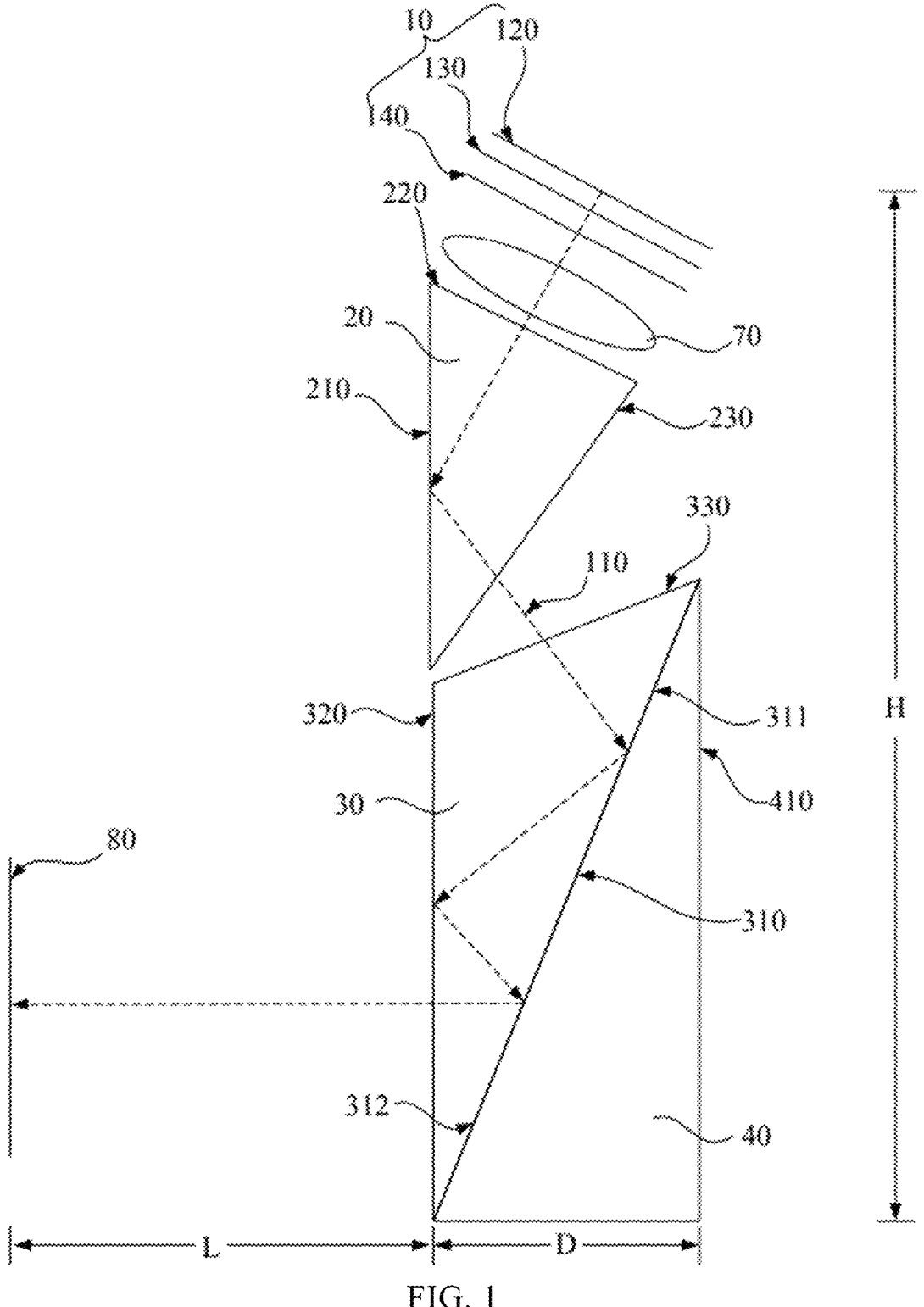
FIG. 1 is a schematic structural illustration of an embodiment of an optical module of the present disclosure.

| Reference Sign | Name | Reference Sign | Name |
| --- | --- | --- | --- |
| 10 | Displaying assembly | 311 | First reflecting area |
| 110 | Light | 312 | Second reflecting area |
| 120 | Display | 320 | Third reflecting surface |
| 130 | Linear polarizer | 330 | Second light-incident surface |
| 140 | Second quarter-wave plate | 40 | Third lens |
| 20 | First lens | 410 | Third light-incident surface |
| 210 | First reflecting surface | 70 | Achromatic lens |
| 220 | First light-incident surface | 80 | Human-eye position |
| 230 | First light-emergent surface | 910 | First quarter-wave plate |
| 30 | Second lens | 920 | Polarizing reflective film |
| 310 | Second reflecting surface | | |

The realization of the purpose, functional characteristics and advantages of the present disclosure will be further described with reference to the embodiments and the accompanying drawings.

DETAILED DESCRIPTION

The technical solutions in the embodiments of the present disclosure will be clearly and completely described below in conjunction with the accompanying drawings in the embodiments of the present disclosure. Obviously, the described embodiments are no more than some of, rather than all of, the embodiments of the present disclosure. All other embodiments obtained based on the embodiments of the present disclosure by those of ordinary skill in the art without creative efforts shall fall within the scope of protection of the present disclosure.

It is to be noted that all directional indications (such as up, down, left, right, front, back . . . ) in the embodiments of the present disclosure are only for explaining relative positional relationship, movement conditions, etc. of each component in a specific posture (as shown in the accompanying drawings). If the specific posture changes, the directional indications will also change accordingly.

In addition, descriptions such as "first", "second", etc. in the present disclosure are only for descriptive purposes and cannot be understood as disclosing or suggesting their relative importance or implicitly indicating quantities of the indicated technical features. Therefore, features defined as "first" and "second" may explicitly or implicitly include at least one of these features. In the description of the present disclosure, "plurality" means at least two, such as two, three, etc., unless otherwise expressly and specifically defined.

In the present disclosure, unless otherwise clearly stated and defined, the terms "connected", "fixed", etc. shall be understood in a broad sense. For example, "fixed" may be a fixed connection, a detachable connection, or integrated as a whole; it may be a mechanical connection or an electrical connection; it can be a direct connection or an indirect connection through an intermediate medium; it can be an internal connection between two elements or an interactive relationship between two elements, unless otherwise clearly defined. For those of ordinary skill in the art, the specific meanings of the above terms in the present disclosure may be understood according to specific circumstances.

Further, although technical solutions of various embodiments of the present disclosure may be combined with each other, combinations thereof must be based on what a person of ordinary skill in the art can implement. If any combination of the technical solutions is contradictory or cannot be implemented, it shall be deemed that such combination does not exist and is not within the protection scope claimed by the present disclosure.

There are several display principles of the HMD, such as VR (Virtual Reality, virtual reality) display and AR (Augmented Reality, augmented reality) display. Images displayed by these HMDs need to be transmitted and magnified via optical lenses. In related technologies, HMDs are bulky and inconvenient for users to wear.

Figure 2:
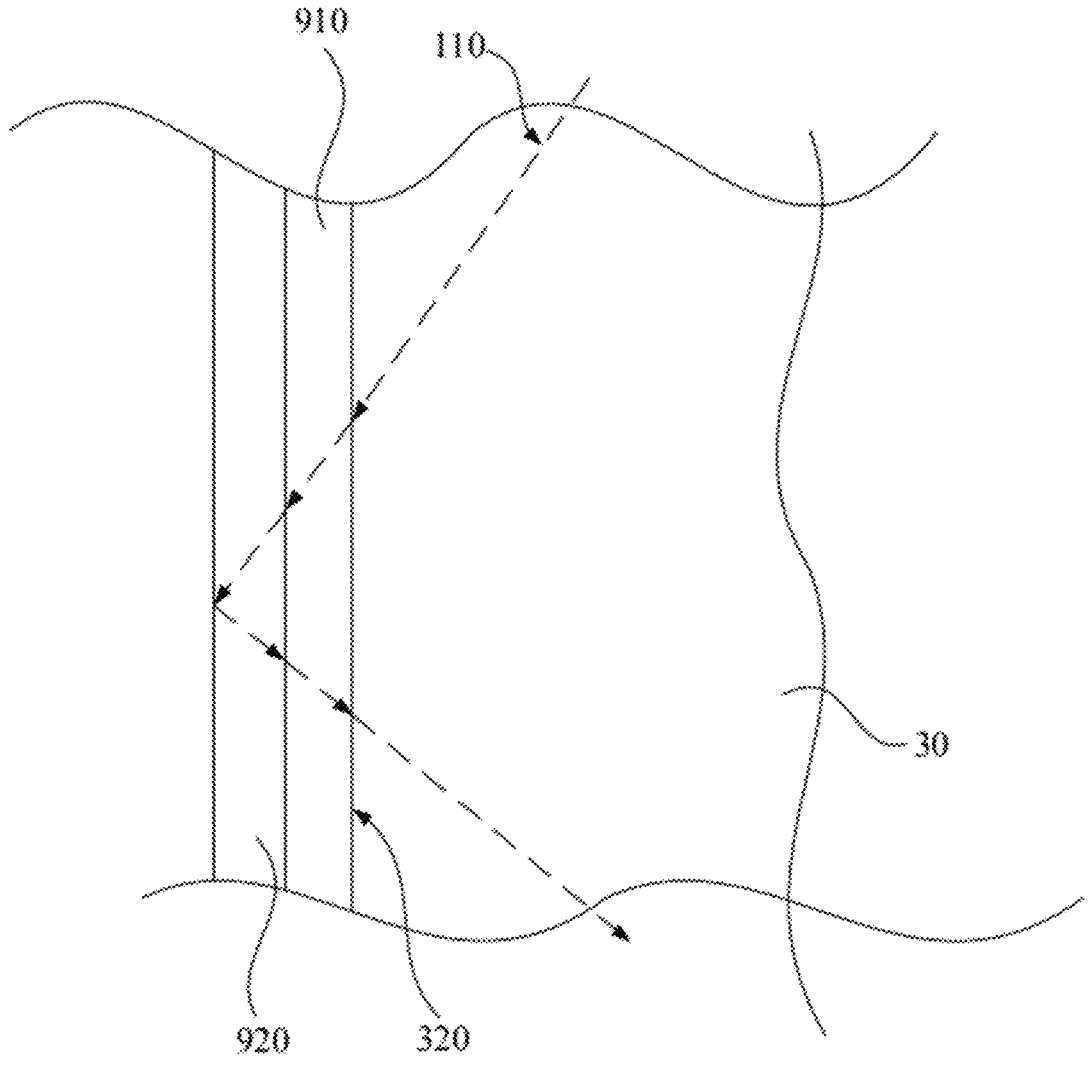
FIG. 2 is a schematic structural illustration of a third reflecting surface in another embodiment of the optical module of the present disclosure.

In order to solve the above problems, as shown in FIGS. 1 and 2, the present disclosure provides an optical module, which includes: a displaying assembly 10, a first lens 20, a second lens 30, a first quarter-wave plate 910 and a polarizing reflective film 920. The first lens 20 and the second lens 30 are provided sequentially along the propagation direction of light 110, while the first quarter-wave plate 910 and the polarizing reflective film 920 are provided on the second lens 30. The first lens 20 and the second lens 30 may be made of optical glass or optical plastic. Optical glass has better optical properties, while optical plastic is easy to process and shape. The first quarter-wave plate 910 and the polarizing reflective film 920 may be independent optical elements; alternatively, they may be a laminated film structure attached to the second lens 30.

The displaying assembly 10 is configured to emit light 110 in a circularly polarized state. The light 110 in a circularly polarized state may be left-hand polarized light or right-hand polarized light. Various light-emitting principles, such as LCOS (Liquid Crystal on Silicon) or AMOLED (Active-matrix organic light-emitting diode), may be adopted by the displaying assembly 10.

The first lens 20 is provided in the light-emergent direction of the displaying assembly 10. The first lens 20 has a first reflecting surface 210. After the light 110 is emitted into the first lens 20, the light 110 is reflected by the first reflecting surface 210 and exits the first lens 20. The first reflecting surface 210 serves to reflect the light 110. After the circularly polarized light 110 is reflected by the first reflecting surface 210, its polarization handedness changes, for example, from left-handed polarized light to right-handed polarized light, or vice versa.

The second lens 30 is provided in the light-emergent direction of the first lens 20. The second lens 30 has a second reflecting surface 310 and a third reflecting surface 320. The light 110 enters the second lens 30 and is reflected by the second reflecting surface 310 to the third reflecting surface 320. The first reflecting surface 210, the second reflecting surface 310 and the third reflecting surface 320 serve to reflect the light 110, ensuring that the light 110 gradually magnifies in its diameter and is magnified for imaging at the human-eye position 80.

The first quarter-wave plate 910 is provided on the third reflecting surface 320, and is a polarization conversion device which can convert linearly polarized light into circularly polarized light and vice versa. The polarizing reflective film 920 is provided on one side of the first quarter-wave plate 910 away from the second reflecting surface 310. The polarizing reflective film 920 has a polarizing transmission direction, which can also be understood as a transmission axis. Only when the polarization direction of the light 110 is in the same direction as the transmission axis of the polarizing reflective film 920, can the light 110 pass through the polarizing reflective film 920; otherwise the light 110 will be reflected by the polarizing reflective film 920.

In the technical solution proposed in this embodiment, the displaying assembly 10 emits light 110 in a circularly polarized state. After the light 110 is emitted into the first lens 20, it is reflected at the first reflecting surface 210 of the first lens 20, and then light 110 enters the second lens 30. The light 110 is also reflected at the second reflecting surface 310 of the second lens 30, and then the light 110 is emitted to the third reflecting surface 320. The circularly polarized light 110 is referred to as CPL, and the linearly polarized light 110 is referred to as LPL. The third reflecting surface 320 is provided with a first quarter-wave plate 910 and a polarizing reflective film 920. The circularly polarized light 110 passes through the first quarter-wave plate 910, and is converted into linearly polarized light. The polarizing reflective film 920 has a polarized transmission direction; at this moment, the polarization direction of the linearly polarized light is different from the polarized transmission direction of the polarizing reflective film 920. The linearly polarized light is reflected back via the polarizing reflective film 920 to the first quarter-wave plate 910 and is converted into circularly polarized light. The light 110 is again emitted to the second reflecting surface 310 of the second lens 30. Under the action of the second reflecting surface 310, the circularly polarized light is reflected to the first quarter-wave plate 910 again, and the polarization handedness of the circularly polarized light changes. After the circularly polarized light passes through the first quarter-wave plate 910, it is again converted into linearly polarized light. At this moment, the polarization direction of the linearly polarized light is in the same direction as the polarized transmission direction of the polarizing reflective film 920. The light 110 passes through the polarizing reflective film 920 and performs imaging at the human-eye position 80. It can be seen from the above that the light 110 emitted by the displaying assembly 10 passes through the first lens 20 and the second lens 30 in sequence: the light 110 first passes by the first reflecting surface 210, then passes by the second reflecting surface 310, and is emitted to the third reflecting surface 320. After being emitted to the third reflecting surface 320, the light is reflected back to the second reflecting surface 310 under the action of the first quarter-wave plate 910 and the polarizing reflective film 920, and is again reflected by second reflecting surface 310. At this moment, the polarization state of the light is circularly polarized. After the light passes through the first quarter-wave plate 910 again, it becomes linearly polarized light and the vibration direction thereof is in the same direction as the transmission direction of the polarizing reflective film 920, so that the light may pass through the polarizing reflective films. The light 110 has undergone at least four reflections and has been transmitted back and forth in the second lens 30. It can be seen that the arrangement of the second lens 30 avoids lengthening propagation path of the light 110 and reduces the need for additional lenses. This enables processing and producing of a thinner optical system, and is beneficial to miniaturization of the HMD.

It should be emphasized that in this embodiment, the first quarter-wave plate 910 and the polarizing reflective film 920 are provided on the side facing the human-eye position 80, i.e., the position of the third reflecting surface 320. The light 110 performs imaging at the human-eye position 80; when leaving the second lens 30, it passes by the third reflecting surface 320, the first quarter-wave plate 910 and the polarizing reflective film 920 in sequence.

In one embodiment of the present application, in order to improve reflection performance of the second reflecting surface 310, the optical module includes a spectroscopic element which is provided on the second reflecting surface 310. The spectroscopic element functions to reflect the light 110 reflected by the polarizing reflective film 920 back to the second reflecting surface 310 again. There are two scenarios that need to be explained here:

The first scenario is that the optical module is used in a VR HMD. In this scenario, there is no need for external light to enter the human eye. The spectroscopic element can include a reflective film provided on the second reflecting surface 310, thereby ensuring that light 110 directed to the second reflecting surface 310 is fully reflected.

The second scenario is that the optical module is used in an AR HMD. In this scenario, external light is required to enter the human eye. The spectroscopic element can be a transflective film to ensure that external light can enter the optical module. The transflective film is provided on the second reflecting surface 310. Under the action of the transflective film, part of the light 110 is transmitted and the other part of the light 110 is reflected, making full use of the reflected light 110. The reflected light 110 satisfies the prerequisite of transmitting through the polarizing reflective film 920, that is, the polarization direction is the same as the transmission direction of the polarizing reflective film 920. Further, the transflective film also has the function of transmitting. When external light hits the transflective film, part of the light is transmitted and the other part of the light is reflected, making full use of the transmitted external light. The transmitted light passes through the first quarter-wave plate 910 and the polarizing reflective film 920 in sequence, and performs imaging at the human-eye position 80. It is to be further pointed out that when the light 110 is emitted from the first lens 20 to the second reflecting surface 310, the incident angle is greater than or equal to the critical angle of total reflection. The light 110 is emitted from an optically dense medium to an optically sparse medium, satisfying all prerequisites of total reflection; as such, the light 110 is reflected toward the third reflecting surface 320.

In this application, there are three scenarios in which the first lens 20 and the second lens 30 are provided.

The first scenario is that the first lens 20 and the second lens 30 are glue bonded. In this scenario, the first lens 20 and the second lens 30 are two independent optical elements. In order to reduce deflection of the light 110, optical glue may be used to glue the first lens 20 and the second lens 30 together. This may also prevent dust and other impurities from dropping into the optical module.

The second scenario is that the first lens 20 and the second lens 30 are provided as a whole. In this scenario, the first lens 20 and the second lens 30 are in an integral structure. The integral structure facilitates positioning during installation, making processing easier and improving efficiency of assembly operations.

The third scenario is that the first lens 20 and the second lens 30 are provided in split parts and spaced apart from each other. The first lens 20 and the second lens 30 are provided separately. In this way, there are other optical media, such as air, existing between the first lens 20 and the second lens 30. After the light 110 passes through the first lens 20, the light 110 is refracted, and the propagation direction of the light 110 is changed. After the light 110 is emitted from the air to the second lens 30, the light 110 is refracted again. Through two refractions, the light 110 is incident on the second reflecting surface 310, which can satisfy the total reflection prerequisites of the light. Further, separate providing of the two lenses enables flexible positioning of the first lens 20 and the second lens 30. In addition, a medium other than air may be provided between the first lens 20 and the second lens 30.

In an embodiment of the present application, there are two scenarios when the light 110 is emitted to the first surface of the first lens 20.

The first scenario is that the light 110 is emitted to the first reflecting surface 210. The incident angle of the light 110 on the first reflecting surface 210 is greater than or equal to the total reflection critical angle. Because air surrounds the outside of the first lens with a greater refractive index than air, the light 110 is emitted at the first reflecting surface 210 from an optically dense medium to an optically sparse medium, satisfying the total reflection prerequisites and reflecting the light 110 to the second lens 30.

In the second scenario, the optical module also includes a reflective film which is provided on the first reflecting surface 210. The reflective film can reflect the received light 110 toward the second lens 30. For example, a reflective film can create a specular reflection effect. With the provision of the reflective film, the incident angle of the light 110 on the first reflecting surface 210 can be flexibly adjusted, which means that the position of the displaying assembly 10 can be more flexible.

In an embodiment of the present application, the first lens 20 further includes a first light-incident surface 220 and a first light-emergent surface 230. The first light-incident surface 220 is provided facing the displaying assembly 10, and the first light-emergent surface 230 is provided facing the second lens 30. Both the first light-incident surface 220 and the first light-emergent surface 230 are connected to the first reflecting surface 210. It can be seen that the first lens 20 has three optical surfaces, for example, it can be of a triangular cross-section. Providing three optical surfaces not only ensures operation of the first lens 20, but also reduces the number of optical surfaces, making the structure of the first lens 20 simpler and easier to process and manufacture.

Further, at least one of the first light-incident surface 220 and the first light-emergent surface 230 is a spherical surface, an aspherical surface or a free-form surface. The first light-incident surface 220 may be any one of a spherical surface, an aspherical surface or a free-form surface. Also, the first light-emergent surface 230 may be any one of a spherical surface, an aspherical surface or a free-form surface. A spherical surface is easy to process and shape, and when the spherical surface is a convex surface, it can also effectively focus light 110. When the spherical surface is a concave surface, it can effectively disperse the light 110 to facilitate image magnification. Moreover, the light 110 is prone to aberration during the transmission; the aberration can be corrected and the imaging quality can be improved through providing of aspherical surfaces and free-form surfaces.

In an embodiment of the present application, the second reflecting surface 310 and the third reflecting surface 320 intersect at one end thereof away from the first lens 20. The second lens 30 includes a second light-incident surface 330 which faces the first lens 20 and is connected to both the second reflecting surface 310 and the third reflecting surface 320. It can be seen that the second lens 30 also has three optical surfaces, and the arrangement of the three optical surfaces It can ensure that the second lens 30 functions, and can also reduce the number of optical surface settings, making the structure of the second lens 30 simple and easy to process and manufacture.

Further, at least one of the second light-incident surface 330 and the second reflecting surface 310 is a spherical surface, an aspherical surface or a free-form surface. The second light-incident surface 330 may be any one of a spherical surface, an aspherical surface or a free-form surface. Also, the second reflecting surface 310 may be a spherical surface, an aspherical surface or a free-form surface. A spherical surface is easy to process and shape, and when the spherical surface is a convex surface, it can also effectively focus light 110. When the spherical surface is a concave surface, it can effectively disperse the light 110 to facilitate image magnification. Moreover, the light 110 is prone to aberration during the transmission; the aberration can be corrected and the imaging quality can be improved through providing of aspherical surfaces and free-form surfaces.

In addition, it is to be noted that the first light-incident surface 220, the first light-emergent surface 230, the second light-incident surface 330 and the second reflecting surface 310 can also be flat surfaces, which are easy to process and have lower costs.

In an embodiment of the present application, in the case that the optical module is used in an AR head mount display, the optical module further includes a third lens 40 provided on the second reflecting surface 310. The third lens 40 includes a third light-incident surface 410 arranged opposite to the third reflecting surface 320 and parallel to the third reflecting surface 320. External light is emitted into the third lens 40 through the third light-incident surface 410. The third lens 40 can resolute the external light to ensure that the external light can be clearly imaged at the human-eye position 80. To facilitate the installation of the optical module, the third light-incident surface 410 and the third reflecting surface 320 are provided parallel to each other. In addition, in order to facilitate docking of the second lens 30 with the third lens 40, the light-emergent surface of the third lens 40 and the second reflecting surface 310 of the second lens 30 have the same structure.

In an embodiment of the present application, the distance between the third light-incident surface 410 and the third reflecting surface 320 is defined as D, and satisfies: D<12 mm. The distance between the third light-incident surface 410 and the third reflecting surface 320 can be understood as the thickness of the optical module. It can be seen that the thickness of the optical module is less than 12 mm, which is relatively thin. With a thickness under 12 mm, it can also be ensured that the light 110 is refracted and reflected smoothly in the second lens 30. However, a thickness greater than 12 mm is too thick and adverse to the miniaturization of the HMD.

In an embodiment of the present application, the light 110 emitted by the displaying assembly 10 performs imaging at the human-eye position 80. The distance from the third reflecting surface 320 to the human-eye position 80 is defined as L, and satisfies: 12 mm<L<18 mm. It can be seen that the human-eye position 80 is close to the optical module, which is also conducive to miniaturization of the head mount display. If L is greater than 18 mm, the head mount display is too large. If L is less than 12 mm, the human eye is too close to the optical module, which is disadvantageous to the user's viewing. For example, if the human eye is too close, the viewing angle will become smaller, and the user's eyelashes may even hit the third reflecting surface 320.

Further, the distance between the central position of the displaying assembly 10 and the bottom end of the third lens 40 is defined as H, and satisfies: 35.0 mm<H<45.0 mm. It can be seen that the height of the optical module is smaller, which is also beneficial to miniaturization of HMDs.

In an embodiment of the present application, in order to facilitate the installation of the optical module, the first reflecting surface 210 and the third reflecting surface 320 are located in the same plane, which facilitates the positioning of the first lens 20 and the second lens 30, as determining the position of one lens facilitates determining the position of the other lens. For example, after the position of the first lens 20 is determined, the position of the second lens 30 can be quickly determined.

In an embodiment of the present application, in order to ensure that the light 110 emitted by the displaying assembly 10 has a uniform state of circular polarization when it enters the first lens 20, displaying assembly 10 includes a display 120, a linear polarizer 130, and a second quarter-wave plate 140. The display 120 is configured to emit light which may be of various polarization states. The linear polarizer 130 and the second quarter-wave plate 140 are both provided between the display 120 and the first lens 20, and are provided in sequence along the propagation direction of the light 110. Through the linear polarizer 130 and the second quarter-wave plate 140, the light 110 is first uniformly converted into linearly polarized light by the linear polarizer 130, and then the light 110 is uniformly converted into circularly polarized light with the same polarization handedness by the second quarter-wave plate 140.

In an embodiment of the present application, the light 110 is prone to chromatic aberration during transmission. To this end, the optical module further includes an achromatic lens 70, which is provided between the first lens 20 and the displaying assembly 10. After the light 110 passes through the achromatic lens 70, it can be ensured that the light 110 with different wavelengths is imaged on the same focal plane. The achromatic lens 70 can be combined with lenses with high and low refractive indexes. Alternatively, a lens made of high refractive index material may be used.

In an embodiment of the present application, when the optical module is used in an AR head mount display, external light needs to pass through the second reflecting surface 310 and the third reflecting surface 320 in order to be perform imaging at the human-eye position 80. In order to allow the light 110 from the first lens 20 to be reflected smoothly, the second reflecting surface 310 includes a first reflecting area 311 and a second reflecting area 312. The first reflecting area 311 receives the light 110 passing through the first lens 20 and reflects the light 110 toward the third reflecting surface 320, and the second reflecting area 312 receive the light 110 reflected by the polarizing reflective film 920 and reflect the light 110 to the third reflecting surface 320 again. The third lens 40 and the second lens 30 are provided spaced apart from each other at least in the first reflecting area 311. It can be seen that the light 110 from the first lens 20 is directed to the first reflecting area 311. By providing the second lens 30 and the third lens 40 spaced apart in the first reflecting area 311, the second lens 30 and the third lens 40 form an air gap in the first reflecting area 311. The refractive index of the second lens 30 is greater than that of air, which also satisfies prerequisites of total reflection of light. It is also possible to avoid considering the refractive index of the third lens 40, further simplifying the design process. It is be noted that in order to facilitate processing and assembly, the spacing position between the second lens 30 and the third lens 40 extends toward the second reflecting area 312. Alternatively, it can be interpreted that there is no contact between the second lens 30 and the third lens 40, and the second lens 30 and the third lens 40 are fixed by other components such as a frame for lenses.

The present disclosure also provides an HMD. The HMD includes a housing and an optical module as described above. The optical module is provided in the housing. The housing can provide an installation space to support the optical module. The optical module is provided in the housing and can also prevent water vapor or dust in the external environment from falling into the interior of the optical module.

For implementations of the HMD of the present disclosure, reference can be made to the above-mentioned embodiments of the optical module, and will not be further elaborated herein.

The above are only preferred embodiments of the present disclosure, and are not intended to limit the patent scope of the present disclosure. Under the inventive concept of the present disclosure, equivalent structural alternations utilizing the description and drawings of the present disclosure, or direct/indirect application in other related technical fields, are all included in the patent protection scope of the present disclosure.

The invention claimed is:

1. An optical module, comprising:
   a displaying assembly, configured to emit light in a circularly polarized state;
   a first lens, provided in a light-emergent direction of the displaying assembly, the first lens having a first reflecting surface, such that the light emerging from the displaying assembly is emitted into the first lens before being reflected by the first reflecting surface and exiting the first lens;
   a second lens, provided in a light-emergent direction of the first lens, the second lens having a second reflecting surface and a third reflecting surface, such that the light emerging from the first lens is emitted into the second lens, reflected at the second reflecting surface of the second lens, and then emitted to the third reflecting surface;
   a first quarter-wave plate, provided on the third reflecting surface, and
   a polarizing reflective film, provided on a side of the first quarter-wave plate that faces away from the second reflecting surface.

2. The optical module of claim 1, further comprising:
   a spectroscopic element, provided on the second reflecting surface.

3. The optical module of claim 2, wherein,
   the spectroscopic element is a transflective film provided on the second reflecting surface.

4. The optical module of claim 1, wherein,
   the first lens and the second lens are glue bonded; or
   the first lens and the second lens are integrally provided.

5. The optical module of claim 1, wherein,
   light is emitted toward the first reflecting surface, and an incident angle of the light on the first reflecting surface is greater than or equal to a critical angle of total reflection; or
   the optical module further comprises a reflective film provided on the first reflecting surface.

6. The optical module of claim 1, wherein, the first lens further comprises: a first light-incident surface provided facing the displaying assembly, and a first light-emergent surface provided facing the second lens, wherein both the first light-incident surface and the first light-emergent surface are connected to the first reflecting surface; and
   at least one of the first light-incident surface and the first light-emergent surface is a spherical surface, an aspherical surface, or a free-form surface.

7. The optical module of claim 1, wherein,
   the second reflecting surface and the third reflecting surface intersect at one end thereof away from the first lens, the second lens including a second light-incident surface which faces the first lens, the second light-incident surface being connected to the second reflecting surface and the third reflecting surface; and
   at least one of the second light-incident surface and the second reflecting surface is a spherical surface, an aspherical surface, or a free-form surface.

8. The optical module of claim 7, further comprising a third lens provided on the second reflecting surface, the third lens comprising a third light-incident surface, the third light-incident surface and the third reflecting surface are provided opposite to each other and parallel to each other.

9. The optical module of claim 8, wherein a defined distance D from the third light-incident surface to the third reflecting surface satisfies: D<12 mm.

10. The optical module of claim 1, wherein light emitted from the displaying assembly causes imaging at a human-eye position; and
   a defined distance L from the third reflecting surface to the human-eye position satisfies: 12 mm<L<18 mm.

11. The optical module of claim 1, wherein
   the first reflecting surface and the third reflecting surface are located in the same plane.

12. The optical module of claim 1, wherein
   the displaying assembly comprises a display, a linear polarizer, and a second quarter-wave plate, the display being configured to emit light, and the linear polarizer and the second quarter-wave plate being sequentially provided in a propagation direction of the light.

13. The optical module of claim 1, further comprising an achromatic lens provided between the first lens and the displaying assembly.

14. The optical module of claim 8, wherein the second reflecting surface comprises a first reflecting area and a second reflecting area,
   wherein the first reflecting area receives light passing through the first lens and reflects it to the third reflecting surface, the second reflecting area receives light reflected by the polarizing reflective film and also reflects it to the third reflecting surface,
   the third lens and the second lens are provided spaced apart from each other at least in the first reflecting area.

15. A head mount display, comprising:
   a housing; and
   an optical module of claim 1 provided in the housing.

16. The optical module of claim 1, wherein the first lens has three optical surfaces and is of a triangular cross-section.

17. The optical module of claim 1, wherein the first lens and the second lens are separately provided and spaced apart from each other.

18. The optical module of claim 1, wherein the light emitted to the third reflecting surface is reflected back to the second reflecting surface by the first quarter-wave plate and the polarizing reflective film, is reflected back to the first quarter-wave plate by the second reflecting surface, the light in the circularly polarized state becomes linearly polarized light by passing through the first quarter-wave plate again, its vibration direction is in the same direction as a transmission direction of the polarizing reflective film, the light passes through the polarizing reflective film, and exits the optical module.

* * * * *